United States Patent
Yamamoto (10) Patent No.: US 10,486,629 B2
(45) Date of Patent: Nov. 26, 2019

(54) VEHICLE FRONT PORTION STRUCTURE

(71) Applicant: TOYOTA JIDOSHA KABUSHIKI KAISHA, Toyota-shi (JP)

(72) Inventor: Yohei Yamamoto, Nagoya-shi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 50 days.

(21) Appl. No.: 15/896,661

(22) Filed: Feb. 14, 2018

(65) Prior Publication Data

US 2018/0236956 A1 Aug. 23, 2018

(30) Foreign Application Priority Data

Feb. 21, 2017 (JP) ................... 2017-030127

(51) Int. Cl.
- *B60R 19/50* (2006.01)
- *B60R 19/18* (2006.01)
- *B62D 25/08* (2006.01)

(52) U.S. Cl.
CPC .............. *B60R 19/50* (2013.01); *B60R 19/18* (2013.01); *B62D 25/08* (2013.01); *B60R 2019/505* (2013.01)

(58) Field of Classification Search
CPC ......... B60R 19/50; B60R 19/18; B62D 25/08; B62D 25/16; B62D 2019/505
See application file for complete search history.

(56) References Cited

U.S. PATENT DOCUMENTS

| | | | |
|---|---|---|---|
| 2013/0026791 A1* | 1/2013 | Huber | B60R 19/24 |
| | | | 296/193.09 |
| 2018/0162306 A1* | 6/2018 | Kaminade | B60Q 1/0023 |

FOREIGN PATENT DOCUMENTS

| | | | |
|---|---|---|---|
| CN | 101085625 B | * | 5/2011 |
| JP | 2006-015810 A | * | 1/2006 |
| JP | 2008013166 A | * | 1/2008 |
| JP | 2009-227188 | | 10/2009 |
| JP | 5136025 B2 | * | 2/2013 |

* cited by examiner

*Primary Examiner* — Lori L Lyjak
(74) *Attorney, Agent, or Firm* — Oblon, McClelland, Maier & Neustadt, L.L.P.

(57) ABSTRACT

A vehicle front portion structure includes a front fender panel, a fender reinforcement attached to the front fender panel, and a head lamp unit fixed to the front fender panel. A rear end portion of the head lamp unit is positioned behind a fixing point at which the front fender panel and the head lamp unit are fixed to each other in a front-rear direction of a vehicle, a protruding portion protruding to the vehicle-width-direction inner side is disposed in the fender reinforcement, and the protruding portion is positioned on a rotation trajectory of the head lamp unit at a time when the head lamp unit is rotated about a virtual line in an up-down direction of the vehicle passing through the fixing point such that the rear end portion of the head lamp unit is toward a vehicle-width-direction outer side.

4 Claims, 6 Drawing Sheets

VEHICLE FRONT PORTION STRUCTURE

INCORPORATION BY REFERENCE

The disclosure of Japanese Patent Application No. 2017-030127 filed on Feb. 21, 2017 including the specification, drawings and abstract is incorporated herein by reference in its entirety.

BACKGROUND

1. Technical Field

The disclosure relates to a vehicle front portion structure.

2. Description of Related Art

Japanese Patent Application Publication No. 2009-227188 (JP 2009-227188 A) discloses a vehicle front portion structure provided with a front fender panel positioned above a front wheel. A fender reinforcement for reinforcing the front fender panel is attached to the vehicle-width-direction inner side of the front fender panel. A head lamp unit is disposed ahead of the front fender panel.

SUMMARY

When a collision object collides with a vehicle from the front side of the vehicle, the head lamp unit may be moved and collide with the inner surface of the front fender panel in the configuration of the vehicle front portion structure disclosed in JP 2009-227188 A due to the impact of the collision with the collision object. Once the head lamp unit collides with the front fender panel as described above, the front fender panel may be deformed despite no direct collision between the collision object and the front fender panel.

An aspect of the disclosure relates to a vehicle front portion structure including a front fender panel positioned above a front wheel, a fender reinforcement attached to a vehicle-width-direction inner side of the front fender panel, and a head lamp unit fixed to a front end portion of the front fender panel. A rear end portion of the head lamp unit is positioned behind a fixing point at which the front fender panel and the head lamp unit are fixed to each other in a front-rear direction of a vehicle. A protruding portion protruding to the vehicle-width-direction inner side is disposed in the fender reinforcement. The protruding portion is positioned on a rotation trajectory of the head lamp unit at a time when the head lamp unit is rotated about a virtual line in an up-down direction of the vehicle passing through the fixing point such that the rear end portion of the head lamp unit is toward a vehicle-width-direction outer side.

According to the aspect of the disclosure, when a collision object collides with the vehicle from the front side of the vehicle, the load that results from the collision with the collision object acts in a concentrated manner on the point at which the front fender panel and the head lamp unit are fixed to each other via the head lamp unit. Then, deformation occurs in the vicinity of the point at which the front fender panel and the head lamp unit are fixed to each other, and the head lamp unit may perform a rotational movement about the virtual line in the up-down direction of the vehicle substantially passing through the fixing point.

According to the aspect of the disclosure, the protruding portion of the fender reinforcement is disposed on the rotation trajectory at a time when the head lamp unit is rotated about the virtual line, and thus the head lamp unit is likely to abut against the protruding portion of the fender reinforcement when the head lamp unit performs a rotational movement. Accordingly, deformation of the front fender panel attributable to a collision of the head lamp unit with the front fender panel can be further suppressed. As a result, when a collision object collides with the vehicle from the front side of the vehicle, deformation of the front fender panel despite no direct collision between the collision object and the front fender panel can be further suppressed.

In the vehicle front portion structure according to the aspect of the disclosure, an extending portion extending toward a rear side in the front-rear direction of the vehicle may be disposed in the rear end portion of the head lamp unit and the protruding portion may be positioned on the rotation trajectory of the extending portion.

According to the aspect of the disclosure, the region of the protruding portion of the fender reinforcement on the rotation trajectory of the head lamp unit is expanded by the presence of the extending portion of the head lamp unit. Accordingly, even when the head lamp unit performs a movement somewhat deviating from a rotational movement about the virtual line, for example, the extending portion of the head lamp unit is capable of colliding with the protruding portion of the fender reinforcement. Therefore, the head lamp unit directly colliding with the front fender panel without colliding with the fender reinforcement after performing a rotational movement can be further suppressed.

In the vehicle front portion structure according to the aspect of the disclosure, the fender reinforcement may have a plate shape and the protruding portion may be disposed in a vehicle-front-side edge portion of the fender reinforcement and protrude to the vehicle-width-direction inner side beyond other places in the vehicle-front-side edge portion.

According to the aspect of the disclosure, the vehicle-front-side edge portion of the fender reinforcement is a part with which the head lamp unit is likely to collide after rotating. The disposition of the protruding portion at the part allows the head lamp unit to collide with the fender reinforcement more reliably after rotating.

In the vehicle front portion structure according to the aspect of the disclosure, the protruding portion may be a part of the vehicle-front-side edge portion of the fender reinforcement in an extension direction of the vehicle-front-side edge portion curved toward the vehicle-width-direction inner side beyond other places. According to the aspect of the disclosure, the gap between the surface of the fender reinforcement on the vehicle-width-direction outer side and the surface of the front fender panel on the vehicle-width-direction inner side is wider in the place where the protruding portion is disposed than in other places in the vehicle-front-side edge portion where the protruding portion is not disposed. Therefore, even when the rear end portion of the head lamp unit collides with the protruding portion of the fender reinforcement and the protruding portion is deformed toward the vehicle-width-direction outer side, the deformed protruding portion is unlikely to collide with the front fender panel. As a result, deformation of the front fender panel attributable to a collision between the deformed protruding portion and the front fender panel can be further suppressed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
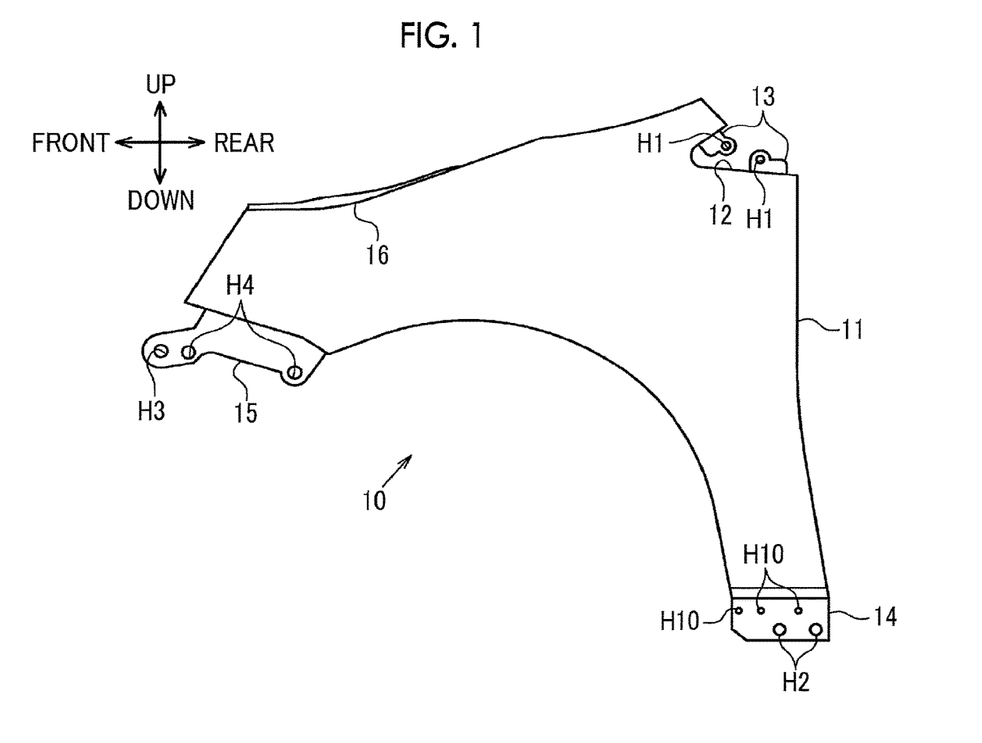
FIG. 1 is a side view of a front fender panel from a vehicle-width-direction inner side.

An embodiment to which the disclosure is applied as a vehicle front portion structure for the right side of a vehicle will be described below. As illustrated in FIG. 1, a front fender panel 10 is provided with a fender body 11 constituting a design surface on a vehicle-width-direction outer side of the vehicle (the back side of the page in FIG. 1). In side view, the fender body 11 is shaped such that one side of a triangle is recessed in an arc shape toward the central side of the triangle. In the fender body 11, one vertex of the triangle is positioned on the front side of the vehicle and the other two vertices are positioned on the rear side of the vehicle. A front wheel of the vehicle is positioned inside the arc of the arc-shaped side of the fender body 11. In other words, the front fender panel 10 as a whole is positioned above the front wheel of the vehicle.

A notch portion 12 recessed toward the front side of the vehicle is cut out in the upper end portion of the edge of the fender body 11 that is on the rear side (at the vertex part of the triangle that is on the rear upper side) of the vehicle. Two attachment pieces 13 protrude from the edge of the notch portion 12. A bolt hole H1 into which a bolt (not illustrated) is inserted passes through each of the attachment pieces 13. The attachment piece 13 of the front fender panel 10 is fixed to a front pillar (also referred to as an A pillar, not illustrated) via the bolt inserted into the bolt hole H1.

A lower side attachment plate 14 extends toward the lower side of the vehicle from the lower end portion of the fender body 11 that is on the rear side (the vertex part of the triangle that is on the rear lower side) of the vehicle. Bolt holes H2 into which bolts (not illustrated) are inserted pass through the lower side attachment plate 14. The lower side attachment plate 14 of the front fender panel 10 is fixed to a rocker portion (not illustrated) via the bolts inserted into the bolt holes H2. Through-holes H10 pass through the lower side attachment plate 14 so that a rocker molding (not illustrated) is attached. The rocker molding covers the rocker portion from the vehicle-width-direction outer side. Clips (projections) protruding from the rocker molding and bolts are inserted into the through-holes H10. As a result, the rocker molding is fixed to the front fender panel 10.

A front side attachment plate 15 extends obliquely toward the front lower side of the vehicle from the lower end portion of the fender body 11 that is on the front side (the vertex part of the triangle that is on the front side) of the vehicle. A lamp fixing hole H3 passes through the front end portion of the front side attachment plate 15 so that a head lamp unit 30 (described later) is fixed. Reinforcement fixing holes H4 pass through the front side attachment plate 15 and behind the lamp fixing hole H3 so that a fender reinforcement 20 (described later) is fixed and fastening with the body of the vehicle is carried out. The reinforcement fixing holes H4 are formed in two places and are apart from each other in the front-rear direction of the vehicle.

Figure 2:
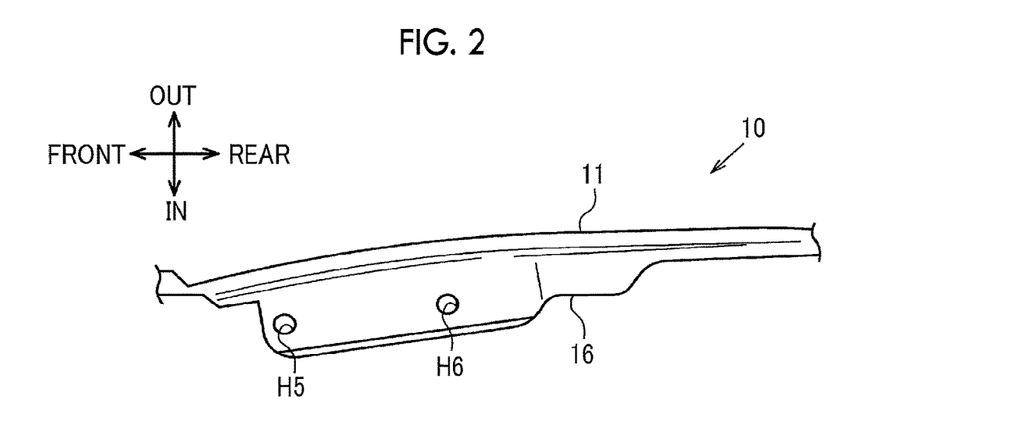
FIG. 2 is a partial top view of the front fender panel.

As illustrated in FIG. 2, an upper wall portion 16 extends from the upper edge of the fender body 11 toward the vehicle-width-direction inner side. The extension length of the upper wall portion 16 toward the vehicle-width-direction inner side decreases in stages toward the rear side of the vehicle. A lamp fixing hole H5 passes through the end portion of the upper wall portion 16 that is on the front side of the vehicle so that the head lamp unit 30 is fixed. A reinforcement fixing hole H6 passes through the upper wall portion 16 and behind the lamp fixing hole H5 so that the fender reinforcement 20 is fixed.

Figure 4:
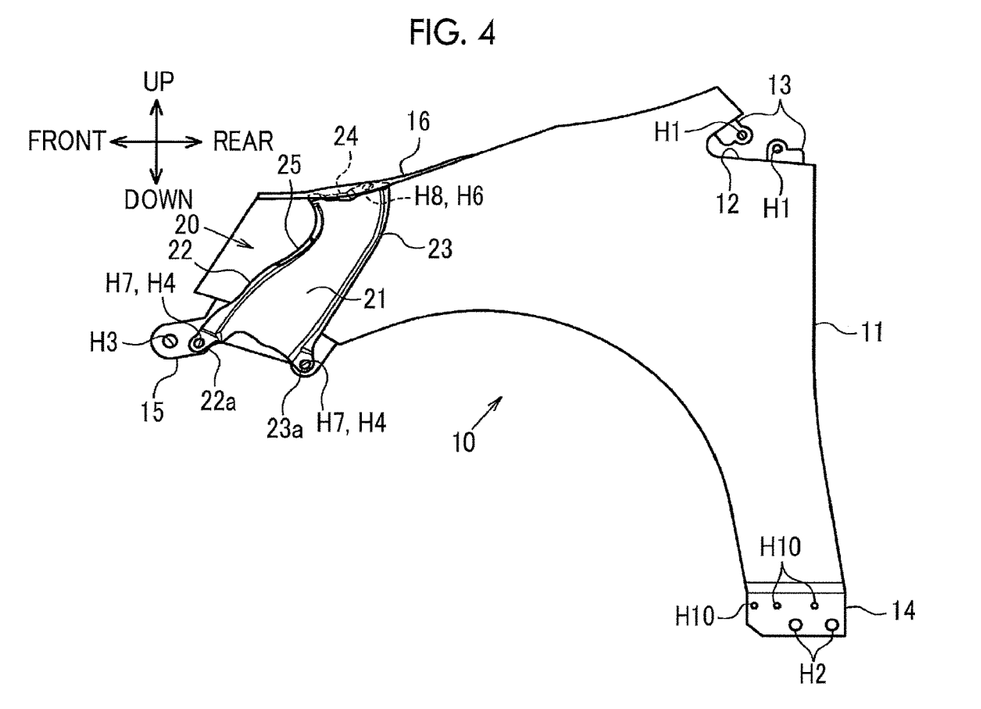
FIG. 4 is a side view of the front fender panel from the vehicle-width-direction inner side in a state where the fender reinforcement is attached.

As illustrated in FIG. 4, the fender reinforcement 20 reinforcing the front fender panel 10 is attached to the vehicle-width-direction inner side of the front fender panel 10 (the front side of the page in FIG. 4). The fender reinforcement 20 is a plate material molded by press molding or the like. The fender reinforcement 20 as a whole extends up to the upper wall portion 16 from the front side attachment plate 15 of the front fender panel 10.

Figure 3:
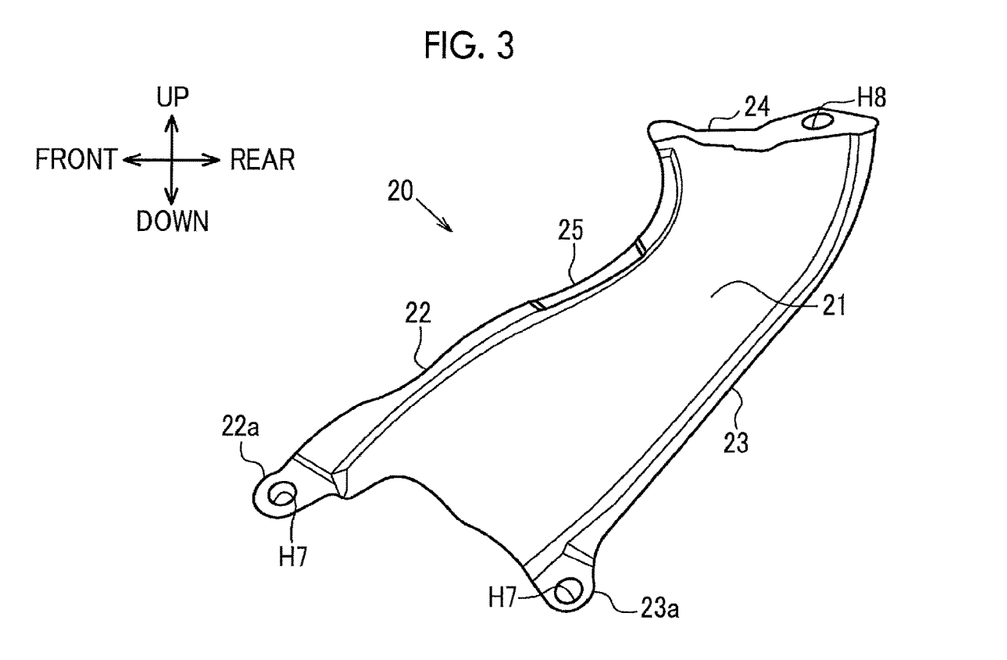
FIG. 3 is a side view of a fender reinforcement from the vehicle-width-direction inner side.

As illustrated in FIG. 3, the fender reinforcement 20 as a whole is bent such that the middle of the fender reinforcement 20 in the front-rear direction of the vehicle protrudes to the vehicle-width-direction inner side. Specifically, a front edge portion 22 of the fender reinforcement 20 is positioned further outside in the vehicle width direction (on the back side of the page in FIG. 3) than a middle portion 21 of the fender reinforcement 20 in the front-rear direction of the vehicle. A lower end portion 22a of the front edge portion 22 protrudes to the lower side beyond the lower edge of the middle portion 21. A lower side fixing hole H7 passes through the lower end portion 22a so that the fender reinforcement 20 is attached to the front fender panel 10. A rear edge portion 23 of the fender reinforcement 20 is positioned further outside in the vehicle width direction than the middle portion 21 of the fender reinforcement 20 in the front-rear direction of the vehicle. A lower side fixing hole H7 passes through a lower end portion 23a of the rear edge portion 23 so that the fender reinforcement 20 is attached to the front fender panel 10. An upper wall portion 24 extends toward the vehicle-width-direction outer side from the upper edge of the middle portion 21 of the fender reinforcement 20. An upper side fixing hole H8 passes through the upper wall portion 24 so that the fender reinforcement 20 is attached to the front fender panel 10.

As illustrated in FIG. 4, the two lower side fixing holes H7 in the fender reinforcement 20 have the same arrangement as the two reinforcement fixing holes H4 in the front fender panel 10. The lower side fixing holes H7 in the fender reinforcement 20 overlap the respective reinforcement fixing holes H4 in the front fender panel 10, and bolts (not illustrated) are inserted into the holes. As a result, the lower side of the fender reinforcement 20 is fixed to the front side attachment plate 15 of the front fender panel 10. The middle portion 21 and the front edge portion 22 of the fender reinforcement 20 are also fixed to the front side attachment plate 15 of the front fender panel 10 by spot welding.

The positional relationship of the upper side fixing hole H8 with respect to the lower side fixing hole H7 in the fender reinforcement 20 is identical to the positional relationship of the reinforcement fixing hole H6 on the upper side with respect to the reinforcement fixing hole H4 on the lower side in the front fender panel 10. The upper side fixing hole H8 in the fender reinforcement 20 overlaps the reinforcement fixing hole H6 in the front fender panel 10, and a bolt (not illustrated) is inserted into the holes. As a result, the upper wall portion 24 of the fender reinforcement 20 is fixed to the upper wall portion 16 of the front fender panel 10. The upper wall portion 24 of the fender reinforcement 20 and the upper wall portion 16 of the front fender panel 10 are fixed to each other by spot welding as well as the bolt.

Figure 5:
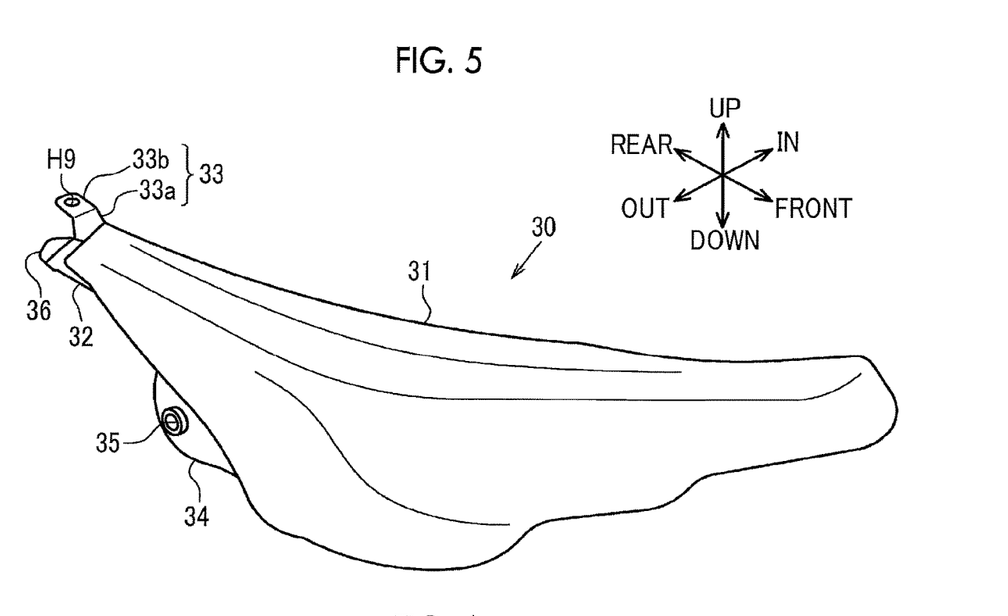
FIG. 5 is a perspective view of a head lamp unit.
Figure 7:
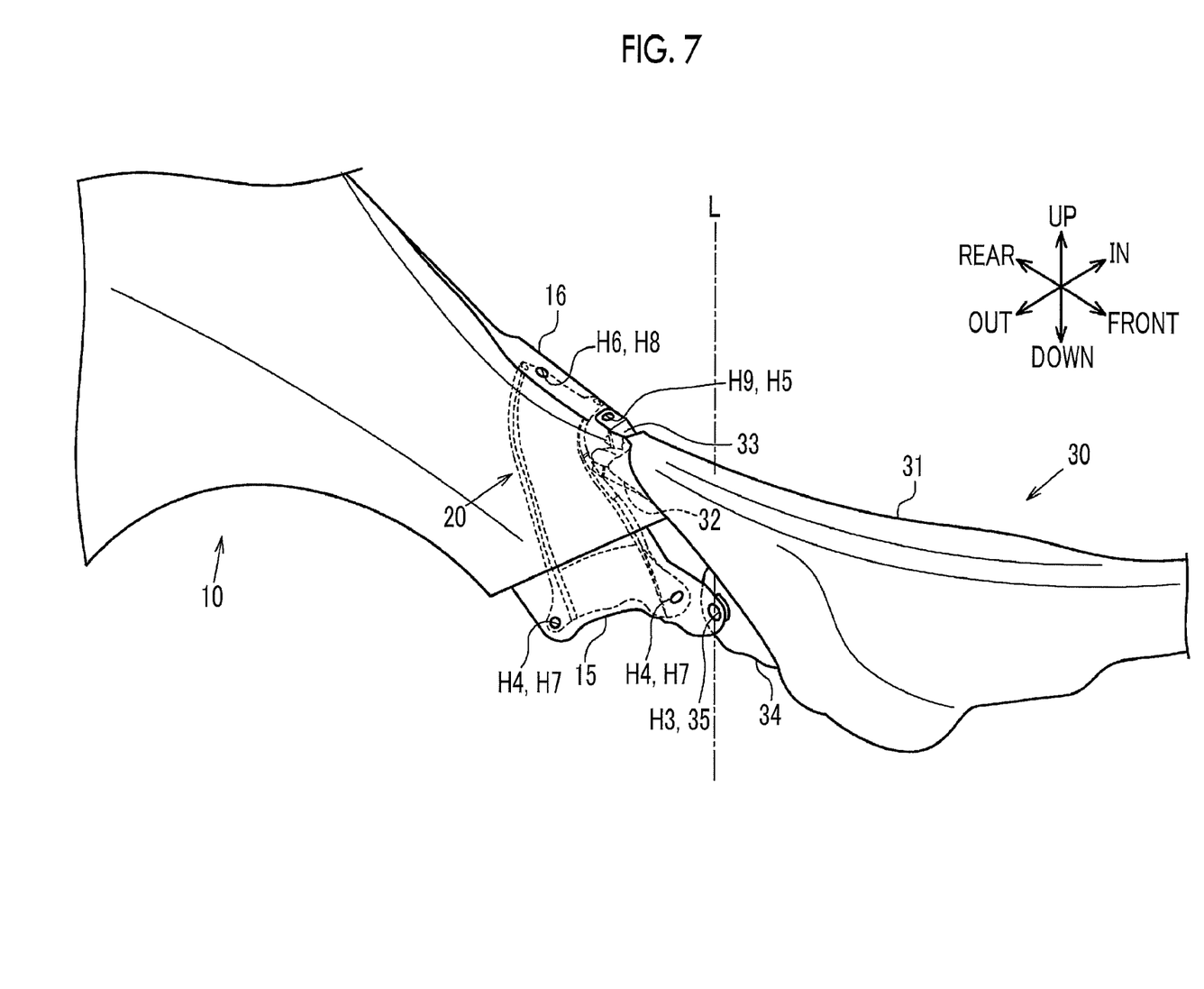
FIG. 7 is a perspective view of a vehicle front portion structure.

As illustrated in FIG. 7, the head lamp unit 30 is attached to the front end portion of the front fender panel 10. The head lamp unit 30 has a built-in head lamp and various built-in circuits for electric power supply to the head lamp. As illustrated in FIG. 5, a unit body 31 of the head lamp unit 30 as a whole is curved such that the unit body 31 is increasingly positioned on the vehicle-width-direction inner side toward the front side of the vehicle. The dimensions of the unit body 31 in the up-down direction of the vehicle and the vehicle width direction increase from the rear end part of the unit body 31 toward the middle part of the unit body 31 in the front-rear direction of the vehicle. The dimensions of the unit body 31 in the up-down direction of the vehicle and the vehicle width direction decrease from the middle part of the unit body 31 in the front-rear direction of the vehicle toward the front end part of the unit body 31. In other words, the unit body 31 is shaped such that the thickness of the unit body 31 gradually increases from the rear side of the vehicle toward the front side of the vehicle and then gradually decreases toward the front side of the vehicle. The walls of the unit body 31 that are on the vehicle-width-direction outer side and on the front side in the front-rear direction of the vehicle are made of a transparent resin material, and thus the light that is emitted by the built-in head lamp of the unit body 31 can be transmitted.

Figure 6:
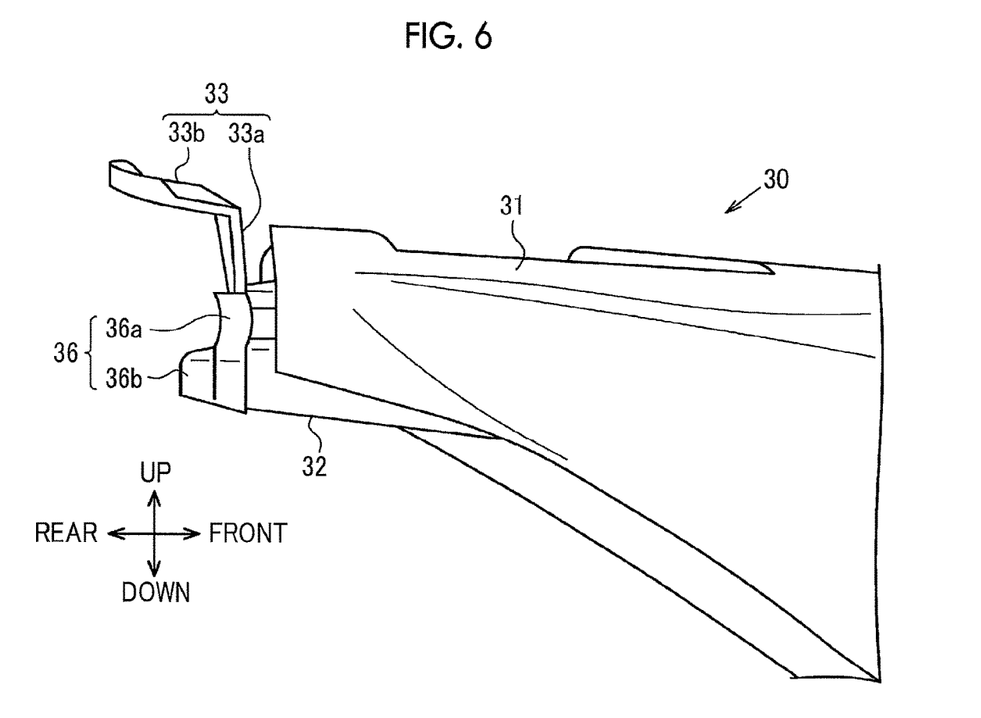
FIG. 6 is a side view of a rear end portion of the head lamp unit.

As illustrated in FIG. 6, a first attachment portion 32 protrudes to the rear side of the vehicle from the rear end of the unit body 31. The first attachment portion 32 is positioned further inside in the vehicle width direction than the outer surface of the unit body 31 on the vehicle-width-direction outer side. The first attachment portion 32 is a part positioned on the vehicle-width-direction inner side of the front fender panel 10 when the head lamp unit 30 is attached to the front fender panel 10.

An attachment piece 33 that has an L-shape in side view protrudes from the upper end portion of the first attachment portion 32. A vertical plate portion 33a and a rear plate portion 33b constitute the attachment piece 33. The vertical plate portion 33a extends to the upper side from the rear end of the unit body 31, and the rear plate portion 33b extends to the rear side of the vehicle from the upper edge of the vertical plate portion 33a. As illustrated in FIG. 5, a rear side fixing hole H9 passes through the rear plate portion 33b so that the head lamp unit 30 is fixed to the front fender panel 10.

A second attachment portion 34 is disposed on the lower side of the rear portion of the unit body 31. The second attachment portion 34 is positioned to be closer to the front side of the vehicle than the first attachment portion 32 and behind the middle part of the unit body 31 in the front-rear direction of the vehicle. The second attachment portion 34 is positioned further inside in the vehicle width direction than the outer surface of the unit body 31 on the vehicle-width-direction outer side. The second attachment portion 34 is a part positioned on the vehicle-width-direction inner side of the front fender panel 10 when the head lamp unit 30 is attached to the front fender panel 10.

The second attachment portion 34 is shaped to bulge to the lower side from the lower surface of the unit body 31. A cylindrical boss portion 35 is disposed on the surface of the second attachment portion 34 that is on the vehicle-width-direction outer side. The central axis of the cylinder of the boss portion 35 is along the vehicle width direction. On the second attachment portion 34, a plurality of boss portions used when other members are attached is disposed along with the boss portion 35. However, the boss portions are not illustrated in the drawings including FIG. 5.

As illustrated in FIG. 7, the rear side fixing hole H9 in the head lamp unit 30 overlaps the lamp fixing hole H5 in the upper wall portion 16 of the front fender panel 10, and a bolt (not illustrated) is inserted into the holes. The lamp fixing hole H3 in the front side attachment plate 15 of the front fender panel 10 overlaps the hole in the boss portion 35 of the head lamp unit 30, and a bolt (not illustrated) is inserted into the holes. As a result, the head lamp unit 30 is fixed to the front fender panel 10.

In the embodiment, the head lamp unit 30 is fixed to the front fender panel 10 in two places, one being the rear side fixing hole H9 in the first attachment portion 32 (the attachment piece 33) and the other being the boss portion 35 of the second attachment portion 34. The head lamp unit 30 is fixed to the front end portion (the lamp fixing hole H3) of the front fender panel 10 in the boss portion 35 positioned on the front side of the vehicle, which is one of the fixing places. Parts of the first attachment portion 32 and the unit body 31 of the head lamp unit 30 on the rear side of the vehicle are positioned behind the point at which the boss portion 35 of the head lamp unit 30 and the lamp fixing hole H3 in the front fender panel 10 are fixed to each other.

Figure 8:
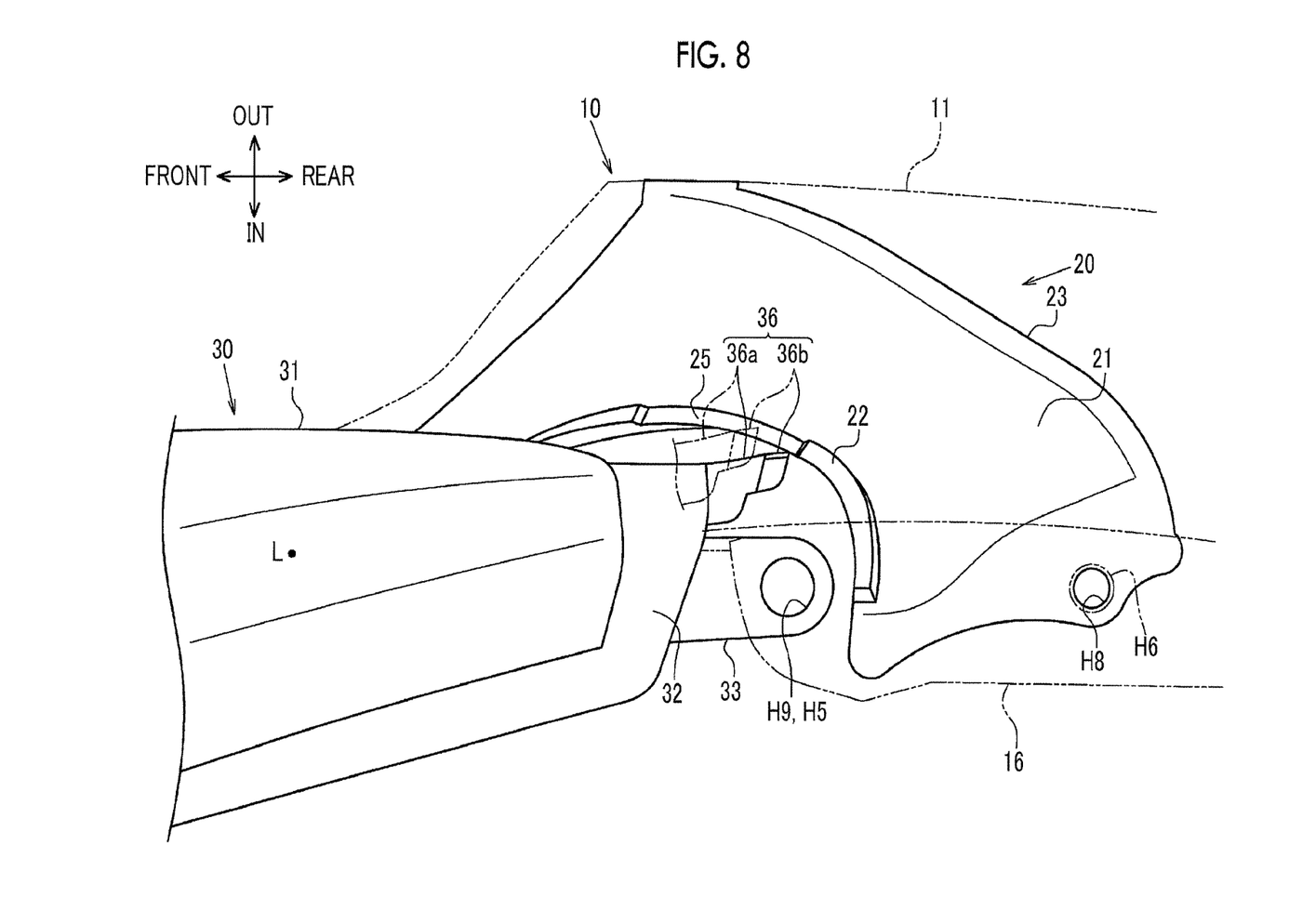
FIG. 8 is a partial top view of the vehicle front portion structure.

As illustrated in FIG. 6, an extending portion 36 extending toward the rear side in the front-rear direction of the vehicle is disposed in the rear end portion of the first attachment portion 32 of the head lamp unit 30. The extending portion 36 has a plate shape and extends along the edge of the rear end surface of the first attachment portion 32. As illustrated in FIG. 8, in the embodiment, the extending portion 36 extends along the part of the edge of the rear end surface of the first attachment portion 32 that is outside the attachment piece 33 in the vehicle width direction. When it comes to the extension lengths of the extending portion 36 to the rear side of the vehicle, the extension length of a lower side part 36b of the extending portion 36 is longer than the extension length of an upper side part 36a of the extending portion 36 as illustrated in FIG. 6. In FIG. 8, the front fender panel 10 is shown in the form of a virtual line. FIG. 8 shows a state where the front fender panel 10 is seen through.

As illustrated in FIG. 3, a protruding portion 25 protruding to the vehicle-width-direction inner side (the front side of the page in FIG. 3) is disposed in the front edge portion 22 of the fender reinforcement 20. The protruding portion 25 is formed by being molded such that a part of the front edge portion 22 of the fender reinforcement 20 in the extension direction of the front edge portion 22 is curved toward the vehicle-width-direction inner side beyond the other place. The surface of the protruding portion 25 on the vehicle-width-direction inner side is positioned further outside in the vehicle width direction than the surface of the middle portion 21 on the vehicle-width-direction inner side. In other words, the protruding portion 25 does not protrude up to the surface of the middle portion 21 on the vehicle-width-direction inner side.

As illustrated in FIGS. 7 and 8, the head lamp unit 30 is assumed to rotate (rotate counterclockwise in FIG. 8) about a virtual line L in the up-down direction of the vehicle passing through the point at which the lamp fixing hole H3 in the front fender panel 10 and the boss portion 35 of the head lamp unit 30 are fixed to each other such that the rear side (the first attachment portion 32 side) of the head lamp unit 30 is toward the vehicle-width-direction outer side. The protruding portion 25 of the fender reinforcement 20 is positioned on the rotation trajectory of the extending portion 36 of the head lamp unit 30 at this time. In the embodiment, the protruding portion 25 of the fender reinforcement 20 is disposed over a length of approximately a quarter of the extension length of the entire front edge portion 22 slightly above the middle of the front edge portion 22 in the extension direction of the front edge portion 22.

The action of the vehicle front portion structure configured as described above will be described below. When a collision object collides with the vehicle from the front side of the vehicle, the load that results from the collision with the collision object acts on the head lamp unit 30. Then, the load is likely to act in a concentrated manner on the fixing place that is closer to the front side of the vehicle than the other place where the head lamp unit 30 and the front fender panel 10 are fixed to each other. In other words, the load from the front side of the vehicle is likely to be concentrated in the place where the boss portion 35 of the head lamp unit 30 and the lamp fixing hole H3 in the front fender panel 10 are fixed to each other. The front side of the head lamp unit 30 according to the embodiment is curved toward the vehicle-width-direction inner side, and thus the load at a time when a collision object collides with the vehicle from the front side of the vehicle is likely to act as a force to push the tip of the head lamp unit 30 to the rear side with respect to the head lamp unit 30. As a result, when the collision object collides with the vehicle from the front side of the vehicle, the head lamp unit 30 may perform a rotational movement about the virtual line L passing through the point at which the boss portion 35 of the head lamp unit 30 and the lamp fixing hole H3 in the front fender panel 10 are fixed to each other.

In the embodiment, the protruding portion 25 of the fender reinforcement 20 is positioned on the rotation trajectory of the extending portion 36 at a time when the head lamp unit 30 rotates about the virtual line L. Accordingly, the extending portion 36 is likely to abut against the protruding portion 25 of the fender reinforcement 20, as virtually illustrated by the two-dot chain line in FIG. 8, when the head lamp unit 30 performs a rotational movement. Especially, in the embodiment, the length of the lower side part 36b of the extending portion 36 toward the rear side of the vehicle is longer than the length of the upper side part 36a of the extending portion 36 toward the rear side of the vehicle, and thus the lower side part 36b is likely to abut against the protruding portion 25. Therefore, deformation of the front fender panel 10 attributable to a collision of the extending portion 36 of the head lamp unit 30 with the front fender panel 10 can be further suppressed. As a result, when a collision object collides with the vehicle from the front side of the vehicle, deformation of the front fender panel 10 despite no direct collision between the collision object and the front fender panel 10 can be further suppressed.

In a case where the head lamp unit 30 collides with the protruding portion 25 of the fender reinforcement 20 after rotating, the load that results from the impact of the head lamp unit 30 is transmitted also to the front fender panel 10 via the fender reinforcement 20. However, the fender reinforcement 20 is fixed to the front fender panel 10 in a plurality of places, and thus the load is transmitted to each of the fixing places in a distributed manner. Accordingly, the front fender panel 10 is unlikely to be deformed by the load transmitted via the fender reinforcement 20.

In some cases, the rear end portion of the unit body 31 of the head lamp unit 30 cannot be disposed with ease on the rear side of the vehicle depending on, for example, the design of the front fender panel 10, the design of the head lamp unit 30, and the compatibility of the front fender panel 10 and the head lamp unit 30 in a plurality of types of vehicles. Assuming that the rear end portion of the unit body 31 is positioned to be closer to the front side of the vehicle than the front edge portion 22 of the fender reinforcement 20, the rear end portion of the head lamp unit 30 may collide directly with the front fender panel 10, without being capable of abutting against the protruding portion 25 of the fender reinforcement 20, when the head lamp unit 30 performs a rotational movement.

In the embodiment, the extending portion 36 extends toward the rear side of the vehicle from the first attachment portion 32 of the head lamp unit 30 in this regard. Accordingly, the rear end (the extending portion 36) of the head lamp unit 30 can be disposed at a position allowing abutting against the protruding portion 25 of the fender reinforcement 20 even when the rear end portion of the unit body 31 cannot be disposed on the rear side of the vehicle.

The region of the protruding portion 25 of the fender reinforcement 20 on the rotation trajectory of the head lamp unit 30 is expanded by the presence of the extending portion 36 of the head lamp unit 30. Accordingly, even when the head lamp unit 30 performs a movement somewhat deviating from a rotational movement about the virtual line L, for example, the extending portion 36 of the head lamp unit 30 is capable of colliding with the protruding portion 25 of the fender reinforcement 20. Therefore, the head lamp unit 30 directly colliding with the front fender panel 10 without colliding with the protruding portion 25 of the fender reinforcement 20 after performing a rotational movement can be further suppressed.

In a configuration in which the head lamp unit 30 is fixed to the front end portion of the front fender panel 10 as in the embodiment, the rear end portion of the head lamp unit 30 is likely to collide with the front side part of the fender reinforcement 20 in the front-rear direction of the vehicle. The extending portion 36 is capable of abutting against the protruding portion 25, even without an excessive increase in the extension length of the extending portion 36 of the head lamp unit 30 to the rear side of the vehicle, for example, by the protruding portion 25 being disposed in the front edge portion 22 of the fender reinforcement 20 as in the embodiment. The above-described disposition of the protruding portion 25 in the front edge portion 22 of the fender reinforcement 20 allows the rear end portion of the head lamp unit 30 to abut against the fender reinforcement more reliably even when the rear end portion (the extending portion 36) of the head lamp unit 30 is not disposed on the rear side of the vehicle to an excessive extent.

In the embodiment, the protruding portion 25 is formed by the front edge portion 22 of the fender reinforcement 20 that has a plate shape being curved. Accordingly, the gap between the surface of the fender reinforcement 20 on the vehicle-width-direction outer side and the surface of the front fender panel 10 on the vehicle-width-direction inner side is wider in the place in the front edge portion 22 where the protruding portion 25 is disposed than in the place in the front edge portion 22 where the protruding portion 25 is not disposed. Therefore, even when the extending portion 36 of the head lamp unit 30 collides with the protruding portion 25 of the fender reinforcement 20 and the protruding portion 25 is deformed toward the vehicle-width-direction outer side, the deformed protruding portion 25 is unlikely to collide with the front fender panel 10. As a result, deformation of the front fender panel 10 attributable to a collision between the deformed protruding portion 25 and the front fender panel 10 can be further suppressed.

The embodiment can be modified as follows.

The overall shape of the front fender panel 10 can be appropriately changed. The overall shape of the front fender panel 10 may be appropriately changed in view of the overall design of the vehicle, the rigidity needed for the front fender panel 10, and so on. Likewise, the overall shape of the fender reinforcement 20 can be appropriately changed in accordance with the shape of the front fender panel 10 and so on.

The shape of the head lamp unit 30 can be appropriately changed as well. Even when the head lamp unit 30 is not shaped to be increasingly curved toward the vehicle-width-direction inner side as the head lamp unit 30 becomes closer to the front side of the vehicle, the head lamp unit 30 is capable of performing a rotational movement about the virtual line L insofar as a collision object collides with the vehicle from the front side of the vehicle.

Methods by which the front fender panel 10 and the fender reinforcement 20 are fixed to each other are not limited to bolting. For example, the front fender panel 10 and the fender reinforcement 20 may be fixed to each other by various types of welding or with an adhesive. Likewise, methods by which the front fender panel 10 and the head lamp unit 30 are fixed to each other are not limited to bolting and the front fender panel 10 and the head lamp unit 30 may be fixed to each other by welding or with an adhesive.

The place where the head lamp unit 30 and the front fender panel 10 are fixed to each other is not limited to the aspect of the embodiment. For example, the rear side fixing hole H9 in the head lamp unit 30, the lamp fixing hole H5 in the front fender panel 10, and the bolt inserted into the holes may be omitted insofar as a needed fixing strength can be obtained. The head lamp unit 30 and the front fender panel 10 may also be fixed to each other in other places in addition to the fixing place according to the embodiment. The lamp fixing hole H3 in the front fender panel 10 is positioned at the foremost end part of the front fender panel 10. Accordingly, it can be said that the head lamp unit 30 is fixed in the front end portion of the front fender panel 10, regardless of the place where the head lamp unit 30 and the front fender panel 10 are fixed to each other, insofar as the boss portion 35 of the head lamp unit 30 is fixed in the lamp fixing hole H3 in the front fender panel 10. A line in the up-down direction of the vehicle that passes through the point at which the boss portion 35 and the lamp fixing hole H3 are fixed to each other corresponds to the virtual line L.

In the embodiment, the entire fender reinforcement 20 that includes the protruding portion 25 is formed by a plate material being molded. However, the disclosure is not limited thereto. For example, another member may be fixed by welding or the like to the surface of the fender reinforcement 20 on the vehicle-width-direction inner side. In this case, the member protrudes to the vehicle-width-direction inner side with respect to the surface of the fender reinforcement 20 on the vehicle-width-direction inner side, and thus is capable of functioning as a "protruding portion".

The fender reinforcement 20 may have a shape other than a plate shape. For example, the fender reinforcement 20 may have a columnar shape insofar as the fender reinforcement 20 is capable of reinforcing the front fender panel 10. In this case, a protruding portion may be disposed that protrudes to the vehicle-width-direction inner side from the surface of the columnar front fender panel 10 on the vehicle-width-direction inner side.

The extension range of the protruding portion 25 of the front edge portion 22 of the fender reinforcement 20 can be appropriately changed. The protruding portion 25 may have any extension range insofar as the protruding portion 25 is positioned on at least the rotation trajectory of the head lamp unit 30 about the virtual line L. Although the head lamp unit 30 may perform a movement deviating from a rotational movement about the virtual line L when a collision object collides with the vehicle from the front side of the vehicle, the degree of the deviation also varies with the configuration of the front portion of the vehicle other than the front fender panel 10 and the head lamp unit 30. The extension range of the protruding portion 25 may be set such that the protruding portion 25 is positioned within the range of the deviation even when the rotational movement of the head lamp unit 30 somewhat deviates.

The degree to which the protruding portion 25 of the fender reinforcement 20 protrudes to the vehicle-width-direction inner side is not limited to the aspect of the embodiment. For example, the protruding portion 25 may protrude to the vehicle-width-direction inner side beyond the surface of the middle portion 21 on the vehicle-width-direction inner side. When the length by which the protruding portion 25 protrudes is excessively increased, the protruding portion 25 abuts against the extending portion 36 of the head lamp unit 30 with the head lamp unit 30 performing no rotational movement. In this case, the protruding portion 25 repeatedly abuts against the extending portion 36 of the head lamp unit 30 due to the vibration during traveling of the vehicle or the like, and then an abnormal noise is generated. In order to prevent the generation of the abnormal noise, a gap may be ensured to some extent between the protruding portion 25 and the extending portion 36 of the head lamp unit 30.

The protruding portion 25 may also be disposed in other places in addition to or instead of the protruding portion 25 that is disposed in the front edge portion 22 of the fender reinforcement 20. For example, the protruding portion 25 may be disposed in the middle portion 21 of the fender reinforcement 20 insofar as the protruding portion 25 is positioned on the rotation trajectory of the head lamp unit 30 (the extending portion 36) about the virtual line L.

The extension length of the extending portion 36 of the head lamp unit 30 to the rear side of the vehicle can be appropriately changed in view of, for example, the position where the protruding portion 25 of the fender reinforcement 20 is formed. For example, the extension length of the upper side part 36*a* of the extending portion 36 may be longer than the extension length of the lower side part 36*b* or the extension length of the upper side part 36*a* of the extending portion 36 may be equal to the extension length of the lower side part 36*b*.

The extending portion 36 of the head lamp unit 30 may have a shape other than a plate shape. For example, the extending portion 36 may have a columnar shape extending to the rear side of the vehicle.

The extending portion 36 of the head lamp unit 30 may be omitted. The omission of the extending portion 36 causes no particular problem insofar as the protruding portion 25 of the fender reinforcement 20 is positioned on the rotation trajectory of the first attachment portion 32 and the rear end portion of the unit body 31 of the head lamp unit 30.

The technology relating to the head lamp unit 30 and the fender reinforcement 20 may also be applied to, for example, a head lamp unit with a built-in turn signal lamp (blinker) and a head lamp unit with a built-in headlight and a built-in turn signal lamp instead of the head lamp unit 30 with the built-in head lamp and so on.

What is claimed is:

1. A vehicle front portion structure comprising:
   a front fender panel positioned above a front wheel;
   a fender reinforcement attached to a vehicle-width-direction inner side of the front fender panel; and
   a head lamp unit fixed to a front end portion of the front fender panel, wherein:
   a rear end portion of the head lamp unit is positioned behind a fixing point at which the front fender panel and the head lamp unit are fixed to each other in a front-rear direction of a vehicle;
   a protruding portion protruding to the vehicle-width-direction inner side is disposed in the fender reinforcement; and
   the protruding portion is positioned on a rotation trajectory of the head lamp unit at a time when the head lamp unit is rotated about a virtual line in an up-down direction of the vehicle passing through the fixing point such that the rear end portion of the head lamp unit is toward a vehicle-width-direction outer side.

2. The vehicle front portion structure according to claim 1, wherein:
   an extending portion extending toward a rear side in the front-rear direction of the vehicle is disposed in the rear end portion of the head lamp unit; and
   the protruding portion is positioned on the rotation trajectory of the extending portion.

3. The vehicle front portion structure according to claim 1, wherein:
   the fender reinforcement has a plate shape; and
   the protruding portion is disposed in a vehicle-front-side edge portion of the fender reinforcement and protrudes to the vehicle-width-direction inner side beyond other places in the vehicle-front-side edge portion.

4. The vehicle front portion structure according to claim 3, wherein the protruding portion is a part of the vehicle-front-side edge portion of the fender reinforcement in an extension direction of the vehicle-front-side edge portion curved toward the vehicle-width-direction inner side beyond other places.

* * * * *